United States Patent [19]

Jander et al.

[11] 4,262,537
[45] Apr. 21, 1981

[54] SPEEDOMETER AND/OR ODOMETER FOR SKIERS

[76] Inventors: Dieter E. Jander, Bäkestrasse 2, 1000 Berlin 45; Arne W. P. Franke, Buchsweilerstrasse 4, 1000 Berlin 33, both of Fed. Rep. of Germany

[21] Appl. No.: 22,439

[22] Filed: Mar. 21, 1979

[30] Foreign Application Priority Data

| Mar. 28, 1978 [DE] | Fed. Rep. of Germany | 2813704 |
| Aug. 28, 1978 [DE] | Fed. Rep. of Germany | 2837834 |
| Nov. 6, 1978 [DE] | Fed. Rep. of Germany | 2848520 |

[51] Int. Cl.³ .......................... G01P 3/49; G01P 1/04; G01C 22/00
[52] U.S. Cl. ......................................... 73/490; 73/493
[58] Field of Search ................. 73/493, 490, 527, 529; 280/11.37 E, 12 A

[56] References Cited

U.S. PATENT DOCUMENTS 3,505,878   4/1970   Moll .................................. 73/493 X

*Primary Examiner*—James J. Gill
*Attorney, Agent, or Firm*—Parmelee, Johnson, Bollinger & Bramblett

[57] ABSTRACT

Device for measuring the speed and/or the distance for skiers, consisting of a toothed wheel positioned at the ski and rotatable around an axis always vertical to the ski axis, the toothing of the wheel being in mechanical contact with the snow, whereby the wheel is protected at the side and in front and the space in which the wheel is positioned is open towards the back.

4 Claims, 6 Drawing Figures

SPEEDOMETER AND/OR ODOMETER FOR SKIERS

BACKGROUND OF THE INVENTION

From the U.S. Pat. No. 3,505,878 a device for skiers for measuring the speed and/or the distance skied, consisting of two toothed wheels on a common shaft positioned laterally to the ski, the toothing of the wheels being in mechanical contact with the snow, means for indicating the speed and/or the distance skied and means for transmitting the rotation of the wheels to the indicating means, is known. In this device there is no lateral protection for the wheels.

SUMMARY OF THE INVENTION

It is an object of the invention to provide a workable speedometer and/or odometer for skiers.

It is a further object of the invention to provide a device for skiers for measuring the speed and/or distance skied, including two toothed wheels on a common shaft positioned laterally to the ski, the toothing of the wheels being in mechanical contact with the snow, means for indicating the speed and/or the distance and means for transmitting the rotation of the wheels to the indicating means, whereby the wheels are protected at the side and in front by a protective wall each and the spaces in which the wheels are positioned are open towards the back.

It is imperative that the space in which the wheels are positioned is open towards the back, because otherwise this space would fill up with snow.

It is a further object of the invention to provide a device for measuring the speed and/or the distance skied for skiers, including one toothed wheel positioned at the back of a ski in a slot opening backwards, the toothing of the wheel being in mechanical contact with the snow, means for indicating the speed and/or the distance skied and means for transmitting the rotation of the wheel to the indicating means.

BRIEF DESCRIPTION OF THE DRAWINGS

The accompanying show in

DETAILED DESCRIPTION OF THE DRAWINGS

Figure 1:
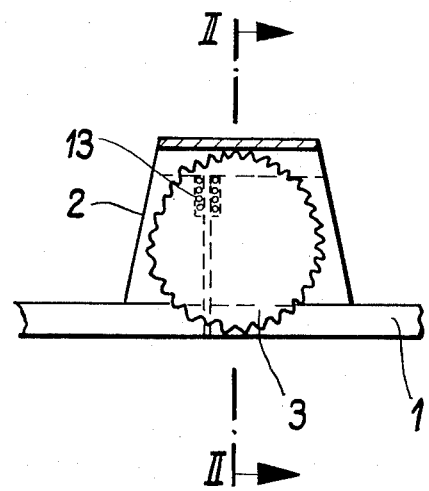
FIG. 1 a sectional view along line I—I of FIG. 2 of a first embodiment of the invention.
Figure 2:
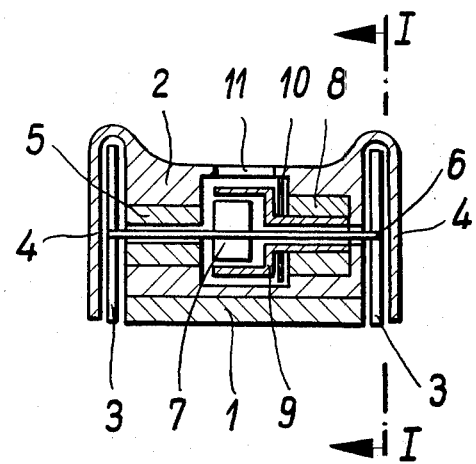
FIG. 2 a sectional view along line II—II of FIG. 1; p FIG. 3 a top view of the embodiment.
Figure 3:
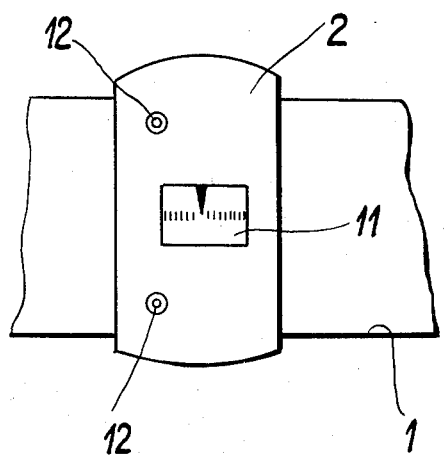

In FIGS. 1 to 3 is (are) 1 a ski, 2 a casing, 3 toothed wheels which can have resilient teeth formed integrally on the periphery of the wheels, 4 walls for the protection of the toothed wheels, 6 a shaft on which the wheels 3 are sitting tightly and which are mounted in the bearing 5, 7 a magnetic disc which sits tightly on the shaft 6, 8 a second bearing, 9 an eddy-current drum which is rotatably mounted in the bearing 8 and through which the shaft 6 is extending freely, 10 a helical spring, one end of which is fastened at the casing and the other end of which is fastened at the eddy-current drum, 11 a window through which the top side of the drum 9 is visible, 12 screws, the heads of which are positioned in openings of the casing 2, and 13 spiral springs, the upper ends of which support themselves on the heads of the screws 12 and the lower ends of which support themselves on shoulders of the casing 2.

The screws 12 are holding the casing 2 resiliently on the ski 1 in such a way that a push from the bottom against the wheels 3 or the side walls 4 results therein that the whole device gives way towards the top. The casing 2 can be mounted in the front part of the front region of the ski for preventing the skis from crossing each other. A device positioned on the other ski for preventing the skis from crossing over each other may also house an additional instrument, as for example, an altimeter.

When the wheels rotate the shaft 6 and the magnetic disc 7 turn. The eddy-current drum 9 is twisted by the magnetic disc 7 against the force of the helical spring 10 to a degree depending on the rotation speed. The angle of rotation of the eddy-current drum 9, thereby the rotation speed of the wheels and thereby the speed of the skier can be read through the window 11. On the surface of the drum is some kind of marking, e.g. in colour.

Figure 4:
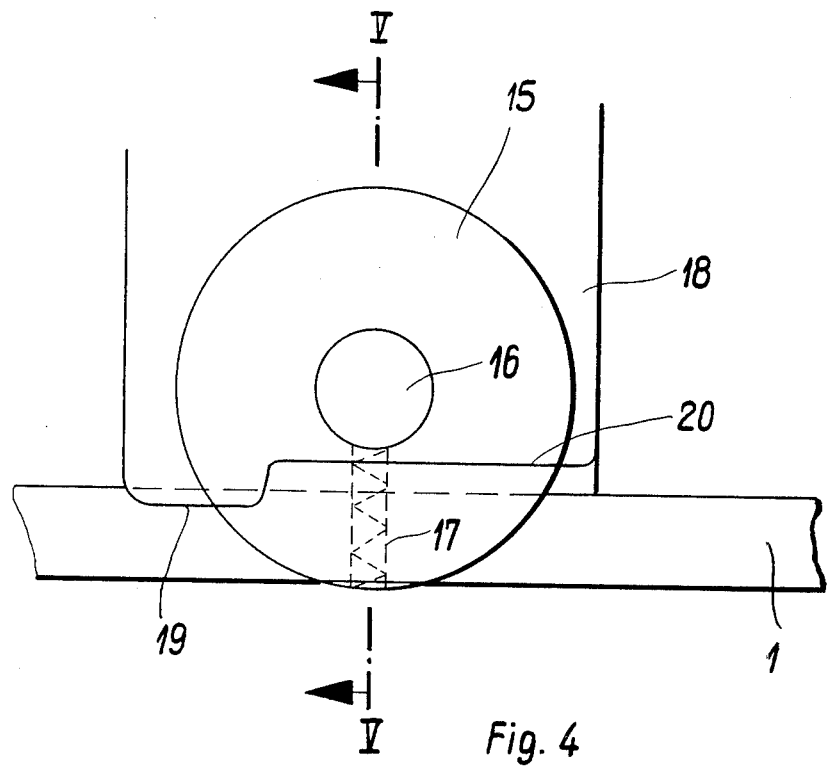
FIG. 4 a side view of the lower part of a second embodiment.
Figure 5:
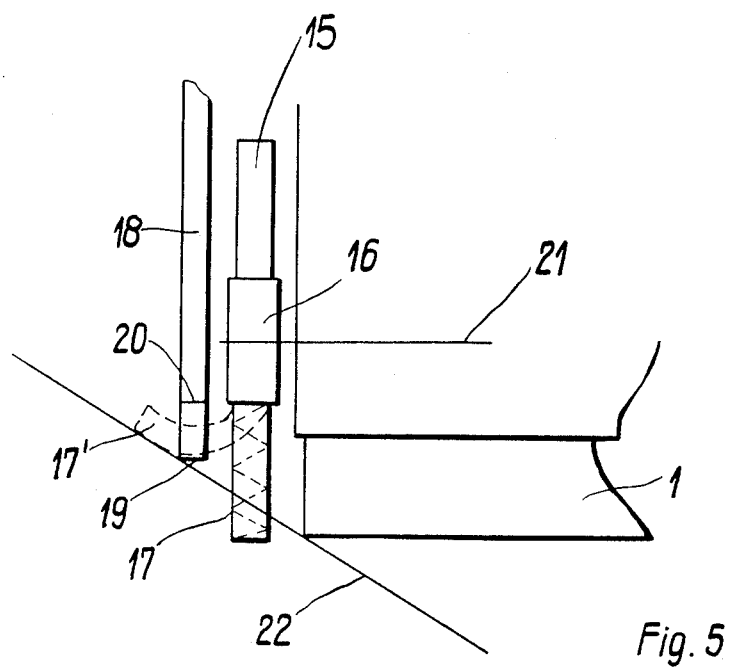
FIG. 5 a sectional view along line V—V of FIG. 4.

In FIGS. 4 and 5 is 1 the ski, 15 a wheel of a second embodiment, 16 a hub of the wheel, 17 one of several springs mounted at the hub 16, 18 a protective wall, 19 its lower front edge piece, 20 its lower back wall piece, 21 the axis of rotation and 22 the underground (when skiing at a slant).

In FIG. 5 the worst position is shown which the underground 22 can take relative to the speedometer. In this position the springs 17 (see the spring 17' in FIG. 5 marked by a broken line) still have enough free room in their lower positions to such an extent that they neither bend too much nor get squeezed between the underground and the lower edge 19 of the protective wall.

With a large angle between underground and ski sole (for example at a steep slope) it could, however, happen that the lower edge 19 of the wall 18 leads and not the ski edge anymore. For this reason it can be useful that the speedometer is arranged immediately before the boot of the skier to avoid large lever arms.

The threads of the springs 17 are preferably not on top of each other, so that they can also receive pressures in the direction of their longitudinal axis.

The device can additionally or without the speedometer show a common mileage indicator counting the number of revolutions of the sheels.

Figure 6:
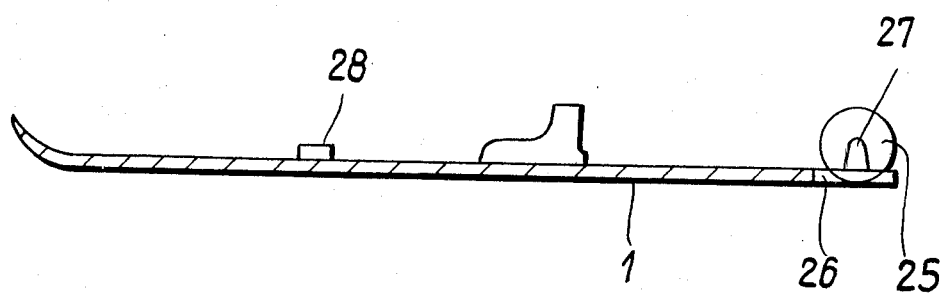
FIG. 6 a third embodiment.

FIG. 6 shows a third embodiment, in which 1 is the ski and 25 a toothed wheel, which is rotatably mounted in a slot 26 by means of a shafe 27. Its revolutions are measured and the determined speed and the distance skied are indicated in the known way by the device 28. Indicating means for this embodiment can further include means for either keeping a reading or allowing the reading to slowly return to zero when the wheel is moved out of contact with the ground beneath it.

We claim:

1. Device for skiers for measuring the speed and/or distance skied, comprising two toothed wheels on a common shaft positioned laterally to the ski, the teething of said wheels being resilient and in mechanical contact with the snow, means for indicating speed and/or distance, means for transmitting the rotation of said wheels to said indicating means, protective walls for protecting said wheels at the sides and leaving spaces in which said wheels are positioned open toward the rear thereof, said protective walls ending at the bottom slightly above the plane of the ski sole, the lower edges of said protective walls being lower at the front than at the back and the step between the front part and the back part of the edges lying before the wheel axis in the direction of motion in such a way that the resilient teeth of said wheels cannot be squeezed between said edges and the underground.

2. Device according to claim 1 wherein a hub of said wheel at which said teeth are mounted ends above the back part of said edge of said protective walls.

3. Device according to claim 1, wherein the height of said step is greater than the thickness of said teeth.

4. Device for skiers for measuring the speed and/or the distance skied, comprising two toothed wheels on a common shaft positioned laterally to the ski, the teething of said wheels being resilient and in mechanical contact with the snow, means for indicating speed and/or distance, means for transmitting the rotation of said wheels to said indicating means, and protective walls for protecting said wheels at the sides and leaving the spaces in which said wheels are positioned open towards the back, said protective walls ending at the bottom slightly above the plane of the ski sole.

* * * * *